United States Patent
Jax et al.

[11] Patent Number: 6,088,417
[45] Date of Patent: Jul. 11, 2000

[54] APPARATUS AND METHOD FOR LEAK DETECTION

[75] Inventors: Peter Jax, Erlangen; Heinrich Lompe, Wiesbaden, both of Germany

[73] Assignee: Siemens Aktiengesellschaft, Munich, Germany

[21] Appl. No.: 09/164,477

[22] Filed: Oct. 1, 1998

Related U.S. Application Data

[63] Continuation of application No. PCT/EP97/01517, Mar. 25, 1997.

[30] Foreign Application Priority Data

Apr. 1, 1996 [DE] Germany ............... 196 12 947

[51] Int. Cl.⁷ ............... G21C 17/00; G21C 17/02
[52] U.S. Cl. ............... 376/250; 376/253; 73/40; 73/40.5 R; 73/863.23
[58] Field of Search ............... 376/250–253; 73/40, 40.5, 863.23

[56] References Cited

U.S. PATENT DOCUMENTS

| | | | |
|---|---|---|---|
| 3,098,023 | 7/1963 | Schluderberg | 204/193.2 |
| 3,288,998 | 11/1966 | Press, Jr. | 250/83.3 |
| 3,293,434 | 12/1966 | Dexter et al. | 250/83.1 |
| 3,341,421 | 9/1967 | Kagi | 176/20 |
| 3,783,268 | 1/1974 | Neeb et al. | 250/83.3 |
| 3,849,655 | 11/1974 | Martucci | 250/366 |
| 3,969,077 | 7/1976 | Hill | 23/230 |
| 3,977,233 | 8/1976 | Issel | 73/40.5 |
| 4,091,283 | 5/1978 | Sun | 250/303 |
| 4,441,357 | 4/1984 | Kahn et al. | 73/40 |
| 4,650,635 | 3/1987 | Le Rat et al. | 376/250 |
| 4,650,637 | 3/1987 | Chubb | 376/253 |
| 4,735,095 | 4/1988 | Issel | 73/864.81 |
| 5,271,901 | 12/1993 | Issel et al. | 422/83 |
| 5,301,538 | 4/1994 | Recla | 73/40.5 R |
| 5,345,479 | 9/1994 | Graham | 376/250 |
| 5,414,742 | 5/1995 | Hornak et al. | 376/251 |
| 5,544,208 | 8/1996 | Poa et al. | 376/253 |
| 5,546,435 | 8/1996 | Collin et al. | 376/253 |
| 5,708,218 | 1/1998 | Jax | 73/863.23 |
| 5,992,217 | 11/1999 | Jax et al. | 73/40 |

FOREIGN PATENT DOCUMENTS

| | | | |
|---|---|---|---|
| 0175219B1 | 3/1986 | European Pat. Off. | 73/864.81 |
| 0692706A2 | 1/1996 | European Pat. Off. | 73/863.23 |
| 2431907 | 1/1976 | Germany | 73/40.5 |
| 58-221141 | 12/1983 | Japan | 376/250 |
| 58-223727 | 12/1983 | Japan | 376/250 |
| 89-336238 | 3/1988 | Japan | 376/250 |
| 1-013497 | 1/1989 | Japan . | |
| 2-167498 | 6/1990 | Japan . | |

OTHER PUBLICATIONS

Japanese Patent Abstract No. 59166886 (Masasisa et al.), dated Sep. 20, 1984.

*Primary Examiner*—Charles T. Jordan
*Assistant Examiner*—Jack Keith
*Attorney, Agent, or Firm*—Herbert L. Lerner; Laurence A. Greenberg; Werner H. Stemer

[57] ABSTRACT

An apparatus and a method for detecting and locating leaks in a nuclear plant, in particular a pipeline in a nuclear plant, include a collection line which is permeable to a substance to be detected and which communicates with a pump and with a sensor for the substance. The sensor has a detector for detecting the radioactivity of the substance or a branch line which communicates with a detector for detecting radioactivity branches off upstream of the sensor. If a radioactive substance reaches the collection line and penetrates it, then the location of the leak can be determined from the instant at which the radioactive substance reaches the detector.

7 Claims, 1 Drawing Sheet

APPARATUS AND METHOD FOR LEAK DETECTION

CROSS REFERENCE TO RELATED APPLICATION

This application is a continuation of copending International Application No. PCT/EP97/01517, filed Mar. 25, 1997, which designated the United States.

BACKGROUND OF THE INVENTION

Field of the Invention

The invention relates to an apparatus for leak detection and leak location in a nuclear plant, in particular in a pipeline of a nuclear plant, having a collection line which is permeable to a substance to be detected and communicates with a pump and with a sensor for the substance, and in which the sensor is not suited to detecting the radioactivity of the substance.

The invention also relates to a method for detecting and locating leaks in a nuclear plant, in particular in a pipeline of a nuclear plant, in which the concentration of a substance from the plant that has penetrated a collection line is measured.

German Published, Non-Prosecuted Patent Application 24 31 907 corresponding to U.S. Pat. Ser. No. 3,977,233, discloses an apparatus for leakage detection and location (which is abbreviated as LEOS). That apparatus includes a collection line which is permeable to the substances to be detected. Communicating with the collection line is a pump, with which volumes of a transport medium, such as air, are pumped in succession through the collection line. Disposed at the end of the collection line is at least one sensor, which detects substances that have penetrated the collection line.

A special construction of such a collection line is known from European Patent 0 175 219 B1. It has permeable points, which may be formed of sintered metal and are spaced apart from one another. The line is impermeable between those permeable points.

U.S. Pat. No. 5,301,538 describes a further leak detecting and locating apparatus, which has at least two collection lines permeable to substances to be detected. The collection lines discharge into a common gas sensor, which in particular may be a sensor for radioactive radiation. In particular, there may be two gas sensors.

A device for monitoring a line in which radioactive substances are carried, is known from Published Japanese Patent Application JP 59 166 986. That line is surrounded by a collection line of larger diameter, which communicates with a radioactivity detector.

SUMMARY OF THE INVENTION

It is accordingly an object of the invention to provide an apparatus and a method for leak detection and location, which overcome the hereinafore-mentioned disadvantages of the heretofore-known apparatuses and methods of this general type in such a way that a second, diverse evidence of leakage is possible. As a result, even more-reliable leakage detection and location are to be assured.

With the foregoing and other objects in view there is provided, in accordance with the invention, an apparatus for detecting and locating leaks in a nuclear plant, in particular in a pipeline of a nuclear plant, comprising a collection line permeable to a substance to be detected; a pump communicating with the collection line; a sensor communicating with the collection line for sensing the substance, the sensor not suited to detecting radioactivity of the substance; and a detector communicating with the collection line for detecting radioactivity of the substance.

This detector may be a gamma detector. In that case, not only the maximum concentration of a substance that has penetrated but also the maximum activity of the penetrating substance is determined and utilized for detecting and locating leaks. Thus two redundant apparatuses for leakage location are obtained.

In accordance with another feature of the invention, there is provided a branch line which communicates with the detector and branches off upstream of the sensor.

In accordance with a further feature of the invention, there is provided a suction pump associated with the detector.

In accordance with an added feature of the invention, there is provided a supply container in which the detector is disposed.

In accordance with an additional feature of the invention, there is provided a valve disposed upstream of the collection line.

In accordance with yet another feature of the invention, the sensor determines a concentration of substances.

In accordance with yet a further feature of the invention, there are provided openings which are located at intervals in the collection line and at which check valves are disposed. These check valves are constructed in such a way that they open if a predetermined pressure fails to be attained, but otherwise are closed.

If the sensor line is closed at its entrance by a valve and a suction pump upstream of the radioactivity detector is turned on, these check valves open once the predetermined pressure fails to be attained. The location of the leak can be determined from the period of time that elapses between the opening of the check valves and the response of the detector for detecting the radioactivity, if the flow speed in the collection line is known.

This advantageously provides two possibilities of leakage location, thereby assuring reliable results.

With the objects of the invention in view there is also provided a method for detecting and locating leaks in a nuclear plant, in particular a pipeline of the nuclear plant, which comprises measuring concentration and radioactivity of a substance from a nuclear plant having penetrated a collection line.

In accordance with another mode of the invention, if the flow speed in the collection line is known, the location of the leak is determined, for instance, from the period of time that has elapsed between a pressure surge in the collection line and a response of the detector for detecting radioactivity.

In accordance with a concomitant mode of the invention, the pressure surge may in particular be brought about by the opening of at least one check valve.

Other features which are considered as characteristic for the invention are set forth in the appended claims.

Although the invention is illustrated and described herein as embodied in an apparatus and a method for leak detection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
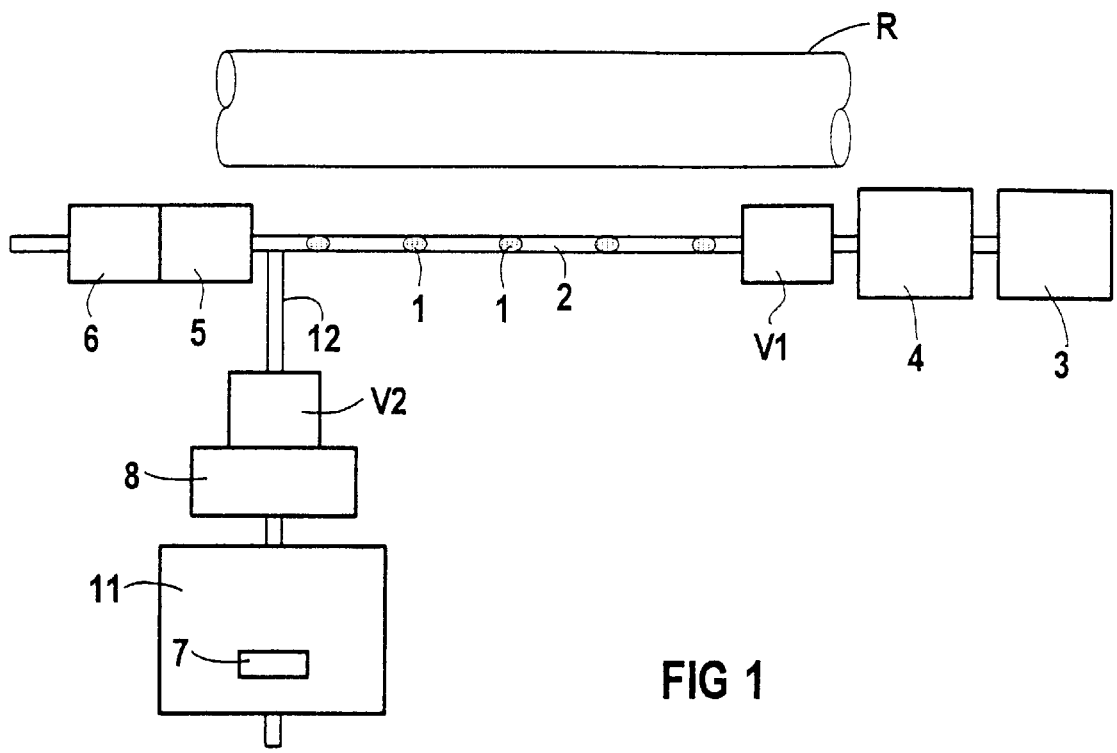
FIG. 1 is a diagrammatic and schematic illustration of a variant of an apparatus according to the invention without check valves.

Referring now to the figures of the drawings in detail and first, particularly, to FIG. 1 thereof, there is seen a nuclear power plant pipeline R which, for instance, carries radioactive primary water. A collection line 2 of an apparatus for leakage detection and leakage location (LEOS) is laid along the pipeline R. The illustrated collection line 2 includes porous sintered metal points 1 which are permeable to a gas, but otherwise it is formed of gas-impermeable metal. The porous sintered metal points 1 are integrated into the collection line 2 at intervals of 0.5 m, for instance.

The leakage detection and locating apparatus, which is known per se, includes a pump 3 which is disposed at an inlet to the collection line 2 for feeding in a transport gas and a sensor 5 disposed at an outlet of the collection line 2 for a substance to be detected, which may have penetrated the collection line. This substance may, for instance, also be moisture (water) if the sensor is a moisture meter.

A branch line 12 which communicates with a detector 7 for detecting radioactivity, branches off upstream of the sensor 5.

This detector 7 may be a gamma detector, for instance. In order to create a greater negative pressure in the collection line 2, a suction pump 8 can be integrated into the branch line 12, and a valve V2 can precede the suction pump. Another valve V1 may be disposed downstream of the pump 3, to close the collection line 2 at its beginning.

A calibration module 4 may be disposed at the beginning of the collection line 2. This module can feed a test gas into the collection line 2 in a defined way in order to calibrate the sensor 5 and the detector 7. A regulator module 6 for adjusting the flow speed in the collection line 2 may also communicate with the collection line 2.

The detector 7 for detecting radioactivity is disposed in a supply container 11, which has a volume of between 1 and 10 liters, for instance. The branch line 12 discharges into this container 11. A drain line which originates at the container 11 may contain a non-illustrated overpressure valve and optionally leads through a return line to a containment of a nuclear power plant.

Figure 2:
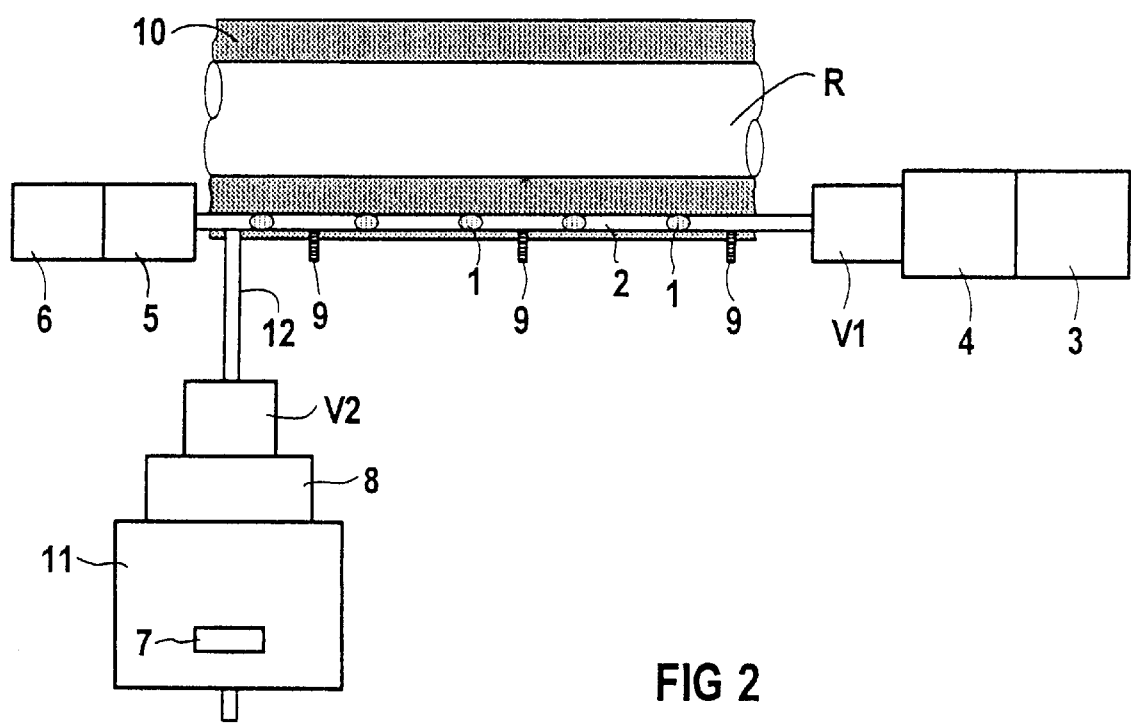
FIG. 2 is an illustration similar to FIG. 1 of a variant with check valves.

FIG. 2 shows a variant of the leakage detecting and locating apparatus of FIG. 1 which includes all of the components of the variant of FIG. 1 and in addition has check valves 9, which are integrated into the collection line 2 at equidistant intervals, such as every two meters. These check valves 9 open if a minimum pressure fails to be attained. In that case, they assure adequate communication between the collection line 2 and a space below the collection line 2 through controlled aspiration points, such as circular openings with a cross section of 1 mm². The variant of FIG. 2 also has a thermal insulation 10, which surrounds the pipeline R and the collection line 2. The check valves 9 protrude from the insulation 10.

The known method for leak detection and location is advantageously supplemented as follows in accordance with the invention:

The collection line 2 is closed off at its beginning, in terms of the flow direction, with the valve V1. The suction pump 8 is then started. The air aspirated by the suction pump 8 is carried through the container 11, in which the activity measurement with the detector 7 is performed. If a radioactive fluid such as primary water escapes from the pipeline R in the event of a leak, the steam content in a space below the pipeline R, and in particular below the insulation 10 and thus in the aspirated air, rises sharply. For example, because of the N16 reaction in the reactor core, the activity amounts to $5.2*10^{12}$ decompositions per second (Bq). If a transport time of 30 seconds to the detector 7 and a measurement time of 10 seconds are taken into account, the activity then drops in accordance with the half life of the isotope (for instance, to $1*10^{11}$ Bq for N16), but is still fully sufficient for detecting the leak, on the condition that a sufficient quantity of water vapor or water steam has also been aspirated with the measurement air. Sintered metal points 1 in the collection line 2 that were usual until now and were constructed only for the presence of the sensor 5 had only a small pore size, such as $0.5\mu$. Optimizing the pore size, for instance to $1\mu$, makes it possible to detect radioactivity with the detector 7, without the usual detection of substance or moisture in the sensor 5 being impaired thereby. However, the flow speed may then have to be reduced in the collection line for measurement with the sensor 5, so as to avoid an excessively pronounced negative pressure and thus an overly strong continuous aspiration stream that might impair locating the leak.

Problems with overly small intake openings in the collection line 2 can be avoided by using the aforementioned check valves 9.

For instance, as long as the leak locating is performed through the use of a moisture sensor 5 with a slight negative pressure in the collection line 2 as compared with the environment, the check valves 9 are not switched. That is, the measurement and locating, which are performed on the basis of the values measured with the sensor 5, are not impeded.

If the suction pump 8 is activated and the valve V1 is closed, then the negative pressure in the collection line 2 rapidly drops below the response threshold of the check valves 9. These valves then open and assure an adequately high air stream to the detector 7, so that an activity measurement is possible. Since the leak is locally limited, it is always a total flow from all of the valves 9 in the form of an air and steam mixture that is carried to the detector 7. The air stream is carried into the suitably dimensioned supply container 11. There, the activity of the total volume is detected integrally by the detector 7.

A defined transport time T elapses from the instant when the check valves 9 open, which can be detected from a pressure surge in the collection line 2, until the instant at which the activated steam reaches the detector 7. A suitable sensor may be present in order to detect the pressure surge. The transport time T is dependent essentially on a distance x between the site in the collection line 2 adjacent the site of the leak on one hand, and the detector 7 on the other hand. Given suitable calibration, the distance x can be determined from the time T. This is true in a simple way where there is an approximately constant flow rate along the collection line 2, but also applies in the event of a nonconstant, linear relationship T (x).

Once detection and location have been successfully accomplished, the measurement operation can be repeated periodically, if the collection line 2 has been rinsed out beforehand with the aid of the pump 3.

In the event that check valves 9 with openings downstream of them are integrated with the collection line 2, then it may be advantageous to vary the size of the openings along the collection line 2 in such a way that a constant mass flow enters per unit of time. This is not automatic for the same opening cross section, because there is a more pronounced negative pressure near the suction pump 8 than at the check valve 9 farthest away from it. This means that the aspiration points located near the suction pump 8 should have a smaller-size opening, while the opening should be selected to be larger as the distance from it increases.

In the event that no check valves 9 are used, then optionally the transport speed of the steam that has penetrated the collection line 2 can be accelerated by briefly opening the valve V1 in the collection line 2, in order to achieve the required transport time. Given this situation, the following overall procedure can be derived: After the closure of the valve V1 in the collection line 2 and the opening of the valve V2 in the branch line 12, the suction pump 8 is started, and the negative pressure in the collection line 2 is monitored until a desired final value is attained. The valve V1 in the collection line 2 is then briefly opened, until a sufficient quantity of substance, especially steam, has arrived within the shortest possible transport time in the container 11. There, the activity is measured continuously with the detector 7 as a function of time, for instance by detecting the number of pulses added together per unit of time.

A sufficient quantity of substance, such as water vapor or water steam as evidence of leakage can be aspirated with the method described. For instance, if a total of 40 seconds have elapsed between when the N16 isotope is created and when it arrives at the detector 7, then an activity of $1*10^{11}$ Bq per cubic meter of primary water still prevails there. For a yield of the detector 7 of 0.1 (that is, if each tenth decomposition is detected) and a measurement time of 10 seconds (30 to 40 seconds after creation of the isotope), this means that $1*10^{-9} m^3 = 1$ mg of primary water leads to an indication or display of 100 pulses. This would be a sufficiently high indication.

If there is a negative pressure of 0.8 bar in the collection line 2, a volumetric flow of 1.4 cm$^3$/sec at a mean speed of 5 cm/s and an inside diameter of the collection line 2 of 0.3 cm is the goal, if there are nine sintered metal points 1. If, in the event of a leak, two sintered metal points 2 are involved which are disposed at intervals of 0.5 m, then a volumetric flow of 0.3 cm$^3$/sec results, and thus for a measurement time of 10 seconds a measurement volume of 3 cm$^3$. If one assumes that in case of a leak, for instance if 100 kg/h are escaping, the primary loop steam containing N16 under the insulation 10 attains a saturation concentration of 50%, then 1 cm$^3$ of air in the collection line 2 contains approximately 0.5 mg of water vapor or water steam. That is, the aforementioned measurement volume contains more than 1 mg of water vapor or water steam, thus making detection possible.

If the pore size of the sintered metal points 1 is increased from 0.5$\mu$ to 1$\mu$, then the volumetric flow is increased by a factor of 3. This is generally sufficient to detect even relatively small steam concentrations.

We claim:

1. An apparatus for detecting and locating leaks in a nuclear plant, comprising:

a collection line permeable to a substance to be detected;

a pump communicating with said collection line;

a sensor communicating with said collection line for sensing the substance, said sensor not suited to detecting radioactivity of the substance;

a detector communicating with said collection line for detecting radioactivity of the substance; and a suction pump associated with said detector.

2. The apparatus according to claim 1, wherein said collection line is disposed in the vicinity of a pipeline of a nuclear plant.

3. The apparatus according to claim 1, including a branch line branching off said collection line upstream of said sensor and communicating with said detector.

4. The apparatus according to claim 1, including a supply container in which said detector is disposed.

5. The apparatus according to claim 1, including a valve disposed upstream of said collection line.

6. The apparatus according to claim 1, including check valves disposed at spaced-apart openings formed in said collection line, said check valves opening if a predetermined pressure fails to be exceeded.

7. The apparatus according to claim 1, wherein said sensor determines a concentration of substances.

* * * * *